June 22, 1965 H. C. DAUBERT, JR 3,190,131
PHOTO-ELECTRIC PICKOFF AND RESOLVER FOR GYROSCOPES
Filed June 30, 1960 2 Sheets-Sheet 1

INVENTOR.
HENRY C. DAUBERT JR.
BY Ernest L Brown
ATTORNEY

3,190,131
PHOTO-ELECTRIC PICKOFF AND RESOLVER FOR GYROSCOPES

Henry C. Daubert, Jr., Grand Rapids, Mich., assignor to Lear Siegler, Inc., Santa Monica, Calif., a corporation of Delaware
Filed June 30, 1960, Ser. No. 39,978
5 Claims. (Cl. 74—5.41)

This invention pertains a to photo-electric pickoff and resolver, and more particularly to a photo-electric pickoff and resolver which is adapted directly to detect rotations in a first coordinate system in terms of components in a second coordinate system.

When a device such as a pendulum, or a device such as that shown and described in patent application, Serial No. 26,997, filed May 5, 1960 for a Vertical Sensor, in the names of Clare E. Barkalow and Henry C. Daubert, Jr., is utilized, it is customary to use a sequence of electromechanical resolvers or pickoffs to measure the rotations of the pendulum relative to a first coordinate system, then to measure the angles between the first system and the second coordinate system. When signals are serially passed through a sequence of resolvers accuracy is lost, and the expense and weight are increased. Further, conventional pickoffs, synchros, or the like, produce a coupling or counter-torque which introduces error and which necessitates the use of additional energy to compensate for the increased drag on the gimbal system.

The device of this invention is adapted to be utilized in a pair of coordinate systems wherein one axis of the first coordinate system is parallel to one axis of the second coordinate system. For example, a vertical gyroscope might have a set of coordinate axes, one of which is the local vertical or azimuth axis. A pendulum may be mounted upon the vertical gyroscope through a gimbal system which is rotated about an axis parallel to the vertical reference axis of the gyroscope. The gimbal system which supports the pendulum then has a different coordinate system from the coordinate system of the vertical gyroscope. If it is desired to utilize the pendulum to erect the gyroscope, formerly it was necessary to resolve motion of the pendulum through the gimbal axes of the pendulum to generate proper erecting signals in the coordinates of the gyroscope.

With the device of this invention—in the vertical gyroscope and pendulum example recited above—a source of illumination is supported by the pendulum to have symmetrical illumination about the axis of the pendulum. Four photo-electric devices are positioned upon the vertical gyroscope and are oriented to cause the signals generated by motion of the pendulum relative to the photoelectric devices to generate gyroscope erecting signals in the coordinate system of the vertical gyroscope. Error caused by multiplicity of resolving devices and by drag on the gimbal system is eliminated.

It is to be noted that radiation devices, other than a source of visible illumination such as—for example—ultra-violet, infra red, gamma rays, or the like may be utilized together with appropriate detecting devices positioned in place of the photo-electric devices which are explicitly described in the specification.

It is therefore an object of this invention to provide a novel angular pickoff.

It is also an object of this invention to provide a novel angular resolver.

It is a more specific object of this invention to provide, in combination, a photo-electric pickoff and resolver which is adapted to generate signals in a first coordinate system due to motion of a source of illumination in a second coordinate system, and still more particularly where the two coordinate systems have at least one common axis, said axis being the axis of symmetry about which four photoelectric devices are pre-positioned to detect motion of said illumination source in said first coordinate system.

Other objects will become apparent from the following description taken in connection with the accompanying drawings in which.

Figure 1:
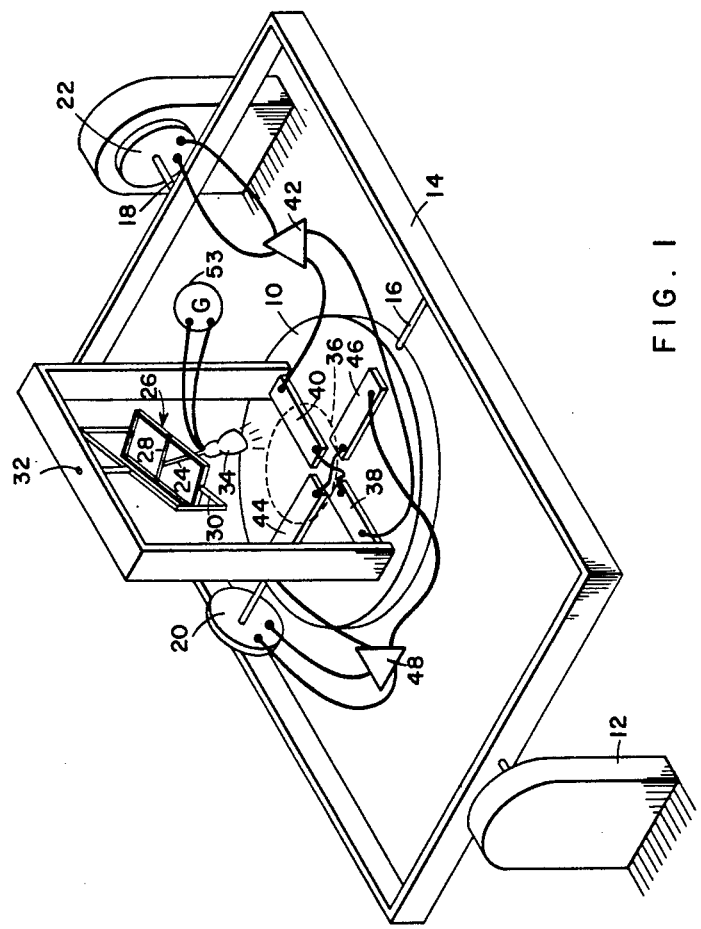
FIGURE 1 is a typical photo-electric pickoff arrangement of this invention.

In FIGURE 1, vertical gyroscope 10 is mounted relative to a supporting craft 12 through an intermediate gimbal 14 upon a pair of orthogonal shafts 16 and 18. Torquing means 20 and 22, adapted to apply torques to shafts 16 and 18 respectively, erect vertical gyroscope 10 to cause its spin axis to be vertical.

Pendulum 24 is supported relative to vertical gyroscope 10 upon a gimbal system 26 whose shafts 28 and 30 are turned about the vertical axis of shaft 32 relative to shafts 16 and 18 respectively. The axis of shaft 32 is parallel to the vertical reference axis of gyroscope 10. A source of illumination 34 is positioned upon pendulum 24. The source of illumination 34, energized by source 53, is adapted to radiate a beam of intensity which is symmetrically disposed about the axis of pendulum 24. The source of illumination 34 need not be a source of visible light but may, alternatively, be an infra-red or ultra-violet source or it may be—for example—a radioactive source which has the requisite symmetrical radiation properties. The symmetry of illumination of illumination source 34 in a displaced position is shown by dotted line 36 upon the surface of vertical gyroscope 10.

A pair of in-line photo-electric devices 38 and 40 are positioned upon vertical gyroscope 10 to detect excursions of illumination source 34 in the direction along photoelectric means 38 and 40. Devices 38 and 40 are preferably long and thin to detect variation in illumination intensity in lines with devices 38 and 40. The electrical outputs of photo-electric means 38 and 40 are connected through amplifier 42 to torquing means 22.

In-line photo-electric means 44 and 46 are positioned upon vertical gyroscope 10 with their in-line direction normal to the in-line direction of photo-electric means 38 and 40. Devices 44 and 46 are preferably long and thin to detect illumination intensity variation in line with devices 44 and 46. The position of photo-electric means 44 and 46 is such as to detect excursions of illumination source 34 in directions normal to that detected by photo-electric means 38 and 40. The electrical output of photo-electric means 44 and 46 is connected through amplifier 48 to erecting torquer 20.

The specific devices of photoelectric means 38, 40, 44 and 46 which are simultaneously energized may be—for example—photo-cells,, photo-tubes, photo-resistances, radiation detectors af various kinds including X-ray and radioactive detecting means in accordance with the particular type of source of illumination 34.

Figure 2:
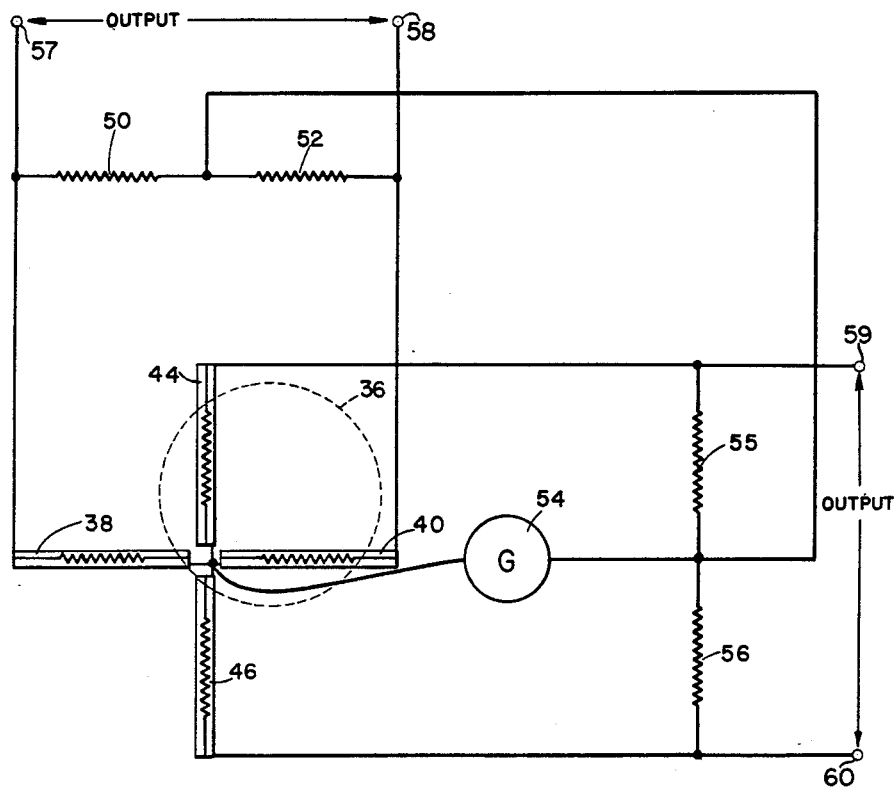
FIGURE 2 is a typical electrical schematic diagram to generate electrical signals from photo-electric devices.

One example of a connection for photo-electric means 38, 40, 44 and 46 is shown in FIGURE 2 where photo-electric means 38, 40, 44 and 46 are photo-sensitive resistors. Photo-sensitive resistors 38 and 40 are connected in a Wheatstone bridge with resistors 50 and 52. In accordance with the usual connection to the input of a Wheatstone bridge, generator means 54 is connected between the intersection of photo-sensitive resistors 38 and 40 and the intersection of resistors 50 and 52. The output of the Wheatstone bridge is taken between the terminal 57 at the junction of resistors 38 and 50 and the terminal 58 at the junction between resistors 40 and 52.

In the same fashion, photo-sensitive resistors 44 and 46 are connected in a Wheatstone bridge with resistors 55 and 56. In accordance with the usual connection of the input of a Wheatstone bridge, generator 54 is connected between the common terminal of resistors 44 and 46 and the common terminal of resistors 55 and 56. The output of the bridge is taken between the terminal 59 at the junction of resistors 44 and 55 and the terminal 60 at the junction of resistors 46 and 56. The outputs of each of the Wheatstone bridges then are connected, respectively, through amplifiers 42 and 48 to erecting torquing means 22 and 20.

In operation, an angular displacement in an arbitrary direction occurs between pendulum 24 and vertical gyroscope 10—perhaps due to gyroscope drift or the like—such as the direction shown in FIGURE 1. As soon as this displacement occurs, an unbalanced signal occurs in at least one pair of photo-electric devices 38, 40, 44 and 46. Since the photo-electric devices 38, 40, 44 and 46 are symmetrical about the vertical axis and are oriented normal to the axes of shafts 16 and 18 of vertical gyroscope 10, the proper erecting signal is provided to torquing means 20 and 22 to cause vertical gyroscope 10 to precess to realign the photo-electric means 38, 40, 44 and 46 to be symmetrical with illumination source 34.

In the figures the illumination pattern 36 is shown displaced into the quadrant between photo-electric devices 40 and 44 to cause the signals applied to amplifiers 42 and 48 to be a measure of the position of pendulum 24. For example, in the device of FIGURE 2 where photo-electric devices 38, 40, 44 and 46 are shown as photo-sensitive resistors the resistances of resistors 40 and 44 have decreased and the resistances of resistors 38 and 46 have increased to unbalance the respective Wheatstone bridges. The voltage between the terminal at the junction of resistors 44 and 55 and the terminal at the junction of resistors 46 and 56 is a measure of the excursion of pendulum 24 in the direction of devices 44 and 46. The voltage between the terminal at the junction of resistors 38 and 50 and the terminal at the junction of resistors 40 and 52 is a measure of the excursion of pendulum 24 in the direction of devices 38 and 40.

Thus the photo-electric pickoff and resolver of this invention immediately detects excursions of pendulum 34 (which moves relative to a first coordinate system) in coordinates of a second coordinate system, thereby increasing the accuracy of the output of the pickoff and resolver system, reducing weight and reducing expense.

Although the device of this invention has been particularly described above it is not intended that the invention should be limited by the particular description which utilizes a vertical gyroscope and a pendulum but only in accordannce with the spirit and scope of the appended claims.

I claim:

1. A vertical gyroscope supported upon at least a pair of axes which are normal to the vertical reference axis of said gyroscope and normal to each other and which form with the vertical axis a first coordinate system; a pendulum supported relative to a second coordinate system which has one axis coaxial with said vertical axis of said first coordinate system; illumination means positioned upon said pendulum and having an illumination pattern symmetrical with the axis of said pendulum; a first pair of in-line photo-electric devices mounted upon said vertical gyroscope, positioned symmetrically with respect to said vertical axis and oriented to detect motion of said illumination source relative to said vertical gyroscope along said devices; a second pair of in-line photo-electric devices mounted upon said gyroscope, positioned with their in-line direction normal to said first pair of photo-electric devices and symmetrically with respect to said vertical axis and oriented to detect motion of said illumination source along said second pair of devices; said illumination source having a uniform illumination pattern about its axis to cause each of said photo-electric devices to be equally illuminated when the axis of said pendulum is in a predetermined no-signal position coaxial with said vertical axis.

2. In combination: a pendulum;
a source of radiation connected to said pendulum;
a first pair of in-line radiation detecting resistance devices;
a second pair of in-line radiation detecting resistance devices;
said first pair and said second pair of radiation detecting resistance devices being positioned with a common axis of symmetry to cause said first pair of radiation detecting resistance devices to detect radiation variation in a predetermined direction normal to said common axis and said second pair of radiation detecting resistance devices to detect variation of radiation in a direction normal to said common axis and normal to the direction of variation detection of said first pair of radiation detecting resistance devices;
and wherein said first pair of radiation detecting resistance devices are connected in a first Wheatstone bridge, said second pair of radiation detecting resistance devices are connected in a second Wheatstone bridge, the outputs of said Wheatstone bridges being measures of motion of said source of radiation;
a vertical gyroscope supported relative to a coordinate system defined by said detecting resistance devices and said axis of symmetry;
and wherein said pendulum is supported relative to a second coordinate system which has one axis parallel to said axis of symmetry of said first coordinate system, said axis of symmetry being the vertical reference axis of said gyroscope.

3. The apparatus of claim 2 wherein said radiation source is a source of illumination and said resistance devices are photoelectric devices.

4. In combination: a source of illumination for emitting a beam of radiation of symmetrical intensity; a first pair of in-line photo-sensitive resistances connected in a first Wheatstone bridge; a second pair of in-line photo-sensitive resistances connected in a second Wheatstone bridge; the said first and second pair of photo-sensitive resistances equally spaced about a common axis of symmetry and positioned to be simultaneously energized by the said source of illumination; said first pair of photo-sensitive resistances to detect variations in radiation in a predetermined direction normal to said common axis of symmetry; the said second pair of photo-sensitive resistances to detect variations in radiation in a direction normal to both the said common axis of symmetry and to the predetermined direction of variation detection of said first pair of photo-sensitive resistances; the resultant output of the said first and second Wheatstone bridges being a measure of motion of the said source of illumination.

5. In combination: a pendulum; a source of illumination connected to said pendulum for emitting a beam of radiation of a symmetrical intensity about the axis of said pendulum; a first pair of in-line photo-sensitive resistances connected in a first Wheatstone bridge; a second pair of in-line photo-sensitive resistances connected in a second Wheatstone bridge; the said first and second pair of photo-sensitive resistances equally spaced about a common axis of symmetry and positioned to be simultaneously energized by the said source of illumination; said first pair of photo-sensitive resistances to detect variations in radiation in a predetermined direction normal to said common axis of symmetry; the said second pair of photo-sensitive resistances to detect variations in radiation in a direction normal to both the said common axis of symmetry and to the predetermined direction of variation detection of said first pair of photo-sensitive resistances; a vertical gyroscope supported relative to a coordinate system defined by said photo-sensitive resistances and said axis of symmetry; and wherein said pendulum is supported relative to a second coordinate system which has one axis parallel to said axis of symmetry of said first coordinate system, said axis of symmetry being the vertical reference axis of said gryoscope; the resultant output of the said first and second Wheatstone bridges being a measure of motion of the said source of illumination.

References Cited by the Examiner

UNITED STATES PATENTS

| | | | |
|---|---|---|---|
| 2,378,526 | 6/45 | Agnew | 250—231 X |
| 2,415,168 | 2/47 | Gieseke | 250—210 |
| 2,641,712 | 6/53 | Kircher | 250—203 X |
| 2,678,401 | 5/54 | Jaeger | 250—210 X |
| 2,921,757 | 1/60 | Houle | 250—203 X |
| 2,965,763 | 12/60 | Lemmerman | 250—203 |
| 3,028,500 | 4/62 | Wallmark | 250—203 X |

RALPH G. NILSON, *Primary Examiner.*

RICHARD M. WOOD, *Examiner.*